United States Patent

Muthiah

(10) Patent No.: US 11,650,757 B2
(45) Date of Patent: May 16, 2023

(54) STORAGE SYSTEM AND METHOD FOR TIME-BASED DATA RETRIEVAL

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 108 days.

(21) Appl. No.: 17/176,818

(22) Filed: Feb. 16, 2021

(65) Prior Publication Data

US 2022/0083268 A1 Mar. 17, 2022

Related U.S. Application Data

(60) Provisional application No. 63/077,000, filed on Sep. 11, 2020.

(51) Int. Cl.
*G06F 3/06* (2006.01)
*G06F 12/10* (2016.01)
*H04N 19/593* (2014.01)

(52) U.S. Cl.
CPC .......... *G06F 3/0659* (2013.01); *G06F 3/0604* (2013.01); *G06F 3/0673* (2013.01); *G06F 12/10* (2013.01); *H04N 19/593* (2014.11); *G06F 2212/657* (2013.01)

(58) Field of Classification Search
CPC .... G06F 3/0659; G06F 3/0604; G06F 3/0673; G06F 12/10; G06F 2212/657; H04N 19/593
See application file for complete search history.

(56) References Cited

U.S. PATENT DOCUMENTS

| 10,445,229 | B1 | 10/2019 | Kuzmin et al. | |
|---|---|---|---|---|
| 2006/0047999 | A1* | 3/2006 | Passerini | G06F 11/1458 711/112 |
| 2019/0155327 | A1 | 5/2019 | Zaidman et al. | |
| 2019/0158203 | A1 | 5/2019 | Brief et al. | |

OTHER PUBLICATIONS

Cai et al., A RISC Implementation of MPEG-2 TS Packetization, 2000, IEEE, 4 pages (Year: 2000).*
Lee, Minsuk, A New File System with Time-Based Indexing Scheme for Continuous Media Streams, 2009, IEEE, 6 pages (Year: 2009).*
U.S. Appl. No. 16/781,688, filed Feb. 4, 2020, entitled "Storage System and Method for Automatic Data Phasing."
International Search Report dated Sep. 13, 2021 for International Application No. PCT/US2021/034021.
Written Opinion dated Sep. 13, 2021 for International Application No. PCT/US2021/034021.
Search Strategy completed Sep. 12, 2021 for International Application No. PCT/US2021/034021.

* cited by examiner

*Primary Examiner* — Gary W. Cygiel
(74) *Attorney, Agent, or Firm* — Crowell & Moring LLP

(57) ABSTRACT

A storage system and method for time-based data retrieval are provided. In one embodiment, a controller of the storage system is configured to receive time information from a host; receive a write command from the host, wherein the write command comprises a logical block address; and create a time-to-logical-block-address map from the time information and the logical block address received from the host. Other embodiments are provided.

20 Claims, 10 Drawing Sheets

Proposed L2T Mapping Table – Write path usage

| Logical Address | Time |
|---|---|
| LBA A | time a |
| LBA B | time b |
| LBA N | time n |

⟷ Entries at 'I' frame granularity, one I frame per GOP and one GOP per second would mean, one entry per second in this table. Can be maintained as necessary.

During data writes, on locking to an I frame, its logical counterpart and the locking time is maintained in this table

FIG. 4

STORAGE SYSTEM AND METHOD FOR TIME-BASED DATA RETRIEVAL

CROSS-REFERENCE TO RELATED APPLICATION

This application claims the benefit of U.S. provisional patent application No. 63/077,000, filed Sep. 11, 2020, which is hereby incorporated by reference.

BACKGROUND

A storage system can contain a controller and a non-volatile memory for storing data from a host. In operation, the host sends a write command with a logical block address to the storage system, and the controller in the storage system stores the data in a physical address in the memory. The storage system maintains a logical-to-physical address table. When the host later sends a read command with the logical block address to the storage system, the controller uses the logical-to-physical address table to identify the physical address in the memory from which to read the data.

BRIEF DESCRIPTION OF THE DRAWINGS

FIG. 4 is an illustration of a logical-address-to-time table of an embodiment.

DETAILED DESCRIPTION

Overview

Figure 1A:
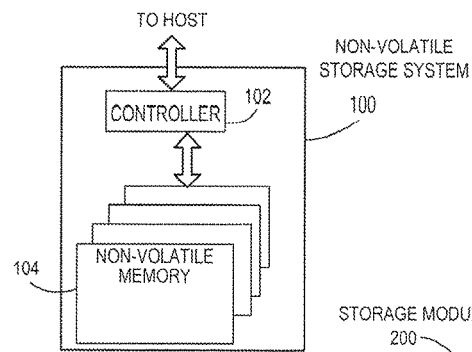
FIG. 1A is a block diagram of a non-volatile storage system of an embodiment.

By way of introduction, the below embodiments relate to a storage system and method for time-based data retrieval. In one embodiment, a storage system is provided comprising a memory and a controller. The controller is configured to receive time information from a host; receive a write command from the host, wherein the write command comprises a logical block address; and create a time-to-logical-block-address map from the time information and the logical block address received from the host.

In some embodiments, the write command further comprises data to be written in the memory, and the time information is part of the data.

In some embodiments, the data comprises video data comprising intra-coded picture frames (I-frames), and the time information is obtained from time stamps of the I-frames.

In some embodiments, the time stamps comprise a Program Clock Reference (PCR) of a Moving Picture Experts Group (MPEG) transport stream.

In some embodiments, the controller is further configured to: receive a command to read data associated with a certain time; determine a logical address of the data associated with the certain time using the time-to-logical-block-address map; determine a physical address in the memory from the logical address using a logical-to-physical address map; and read the data stored at the physical address in the memory.

In some embodiments, start and end times of the time-to-logical-block-address map change during host writes and overwrites.

In some embodiments, the time information from the host comprises absolute host time.

In some embodiments, the controller is further configured to populate the time-to-logical-block-address map with an invalid entry for a subsequent write command in response to the subsequent write command being associated with non-video data.

In some embodiments, the controller is further configured to populate the time-to-logical-block-address map with an invalid entry for a subsequent write command in response to the subsequent write command being associated with logical data that is broken for a time entry.

In some embodiments, the controller is further configured to mark a time slot as high endurance.

In some embodiments, the memory comprises a three-dimensional memory.

In another embodiment, a method for enabling time-based data retrieval is presented that is performed in a storage system comprising a memory. The method comprises: receiving a command from a host to write media data to a logical address; determining time information from the media data; and generating a table associating the logical address with the time information.

In some embodiments, the media data comprises video data, which comprises intra-coded picture frames (I-frames), and the time information is obtained from time stamps of the I-frames.

In some embodiments, the media data comprises audio data, which comprises Program Clock Reference (PCR) time stamps.

In some embodiments, the method further comprises: receiving a command to read media data associated with a certain time; determining a logical address of the media data associated with the certain time using the table; determining a physical address in the memory from the logical address using a logical-to-physical address map; and reading the media data stored at the physical address in the memory.

In some embodiments, the method further comprises marking a time slot as high endurance.

In another embodiment, a storage system is provided comprising a memory and means for creating a time-to-logical-block-address table from time information and a logical block address received from a host.

In some embodiments, the means for using is implemented in a controller.

In some embodiments, the storage system is integrated in the host.

In some embodiments, the memory comprises a three-dimensional memory.

In some embodiments, the storage system further comprises means for using the time-to-logical-block-address table to retrieve data from the memory in response to a read command specifying a time.

In some embodiments, the time information is obtained from time stamps of intra-coded picture frames (I-frames) of video data received from the host.

In some embodiments, the time stamps comprise a Program Clock Reference (PCR) of a Moving Picture Experts Group (MPEG) transport stream.

Other embodiments are possible, and each of the embodiments can be used alone or together in combination. Accordingly, various embodiments will now be described with reference to the attached drawings.

EMBODIMENTS

Figure 1B:
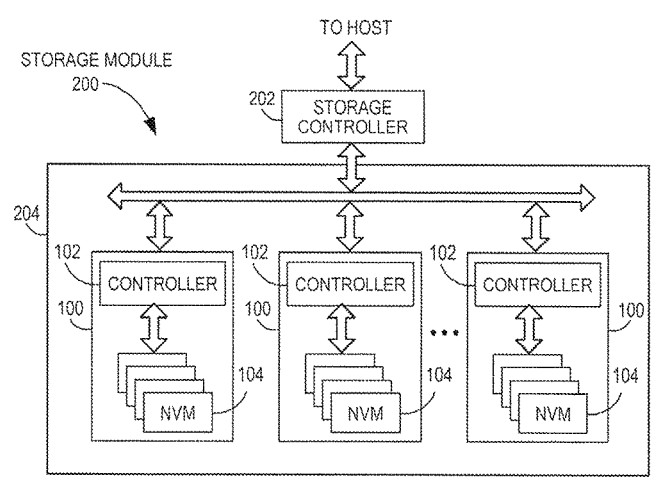
FIG. 1B is a block diagram illustrating a storage module of an embodiment.
Figure 1C:
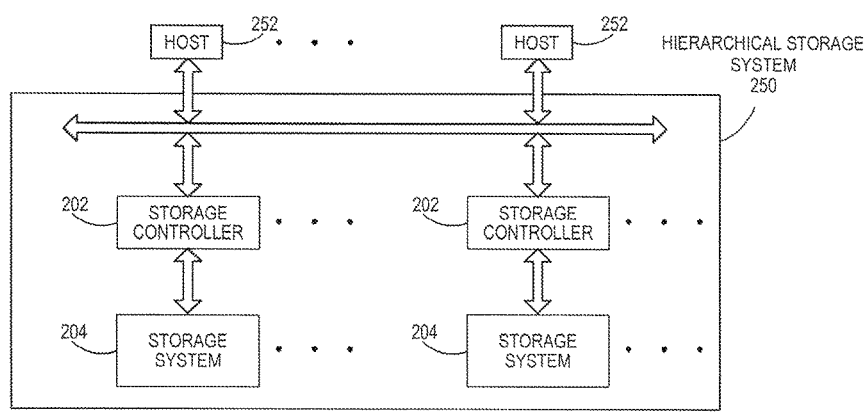
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
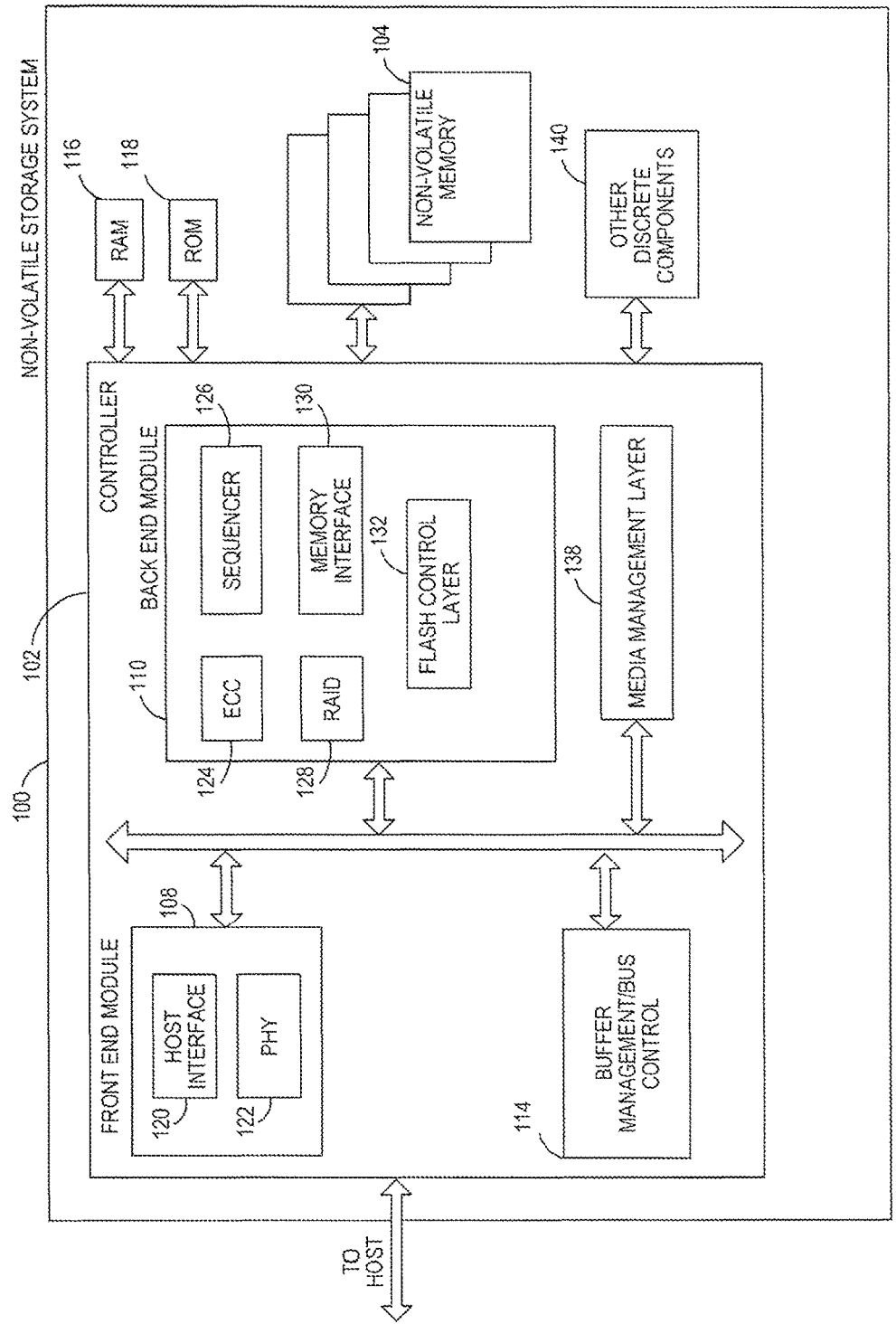
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
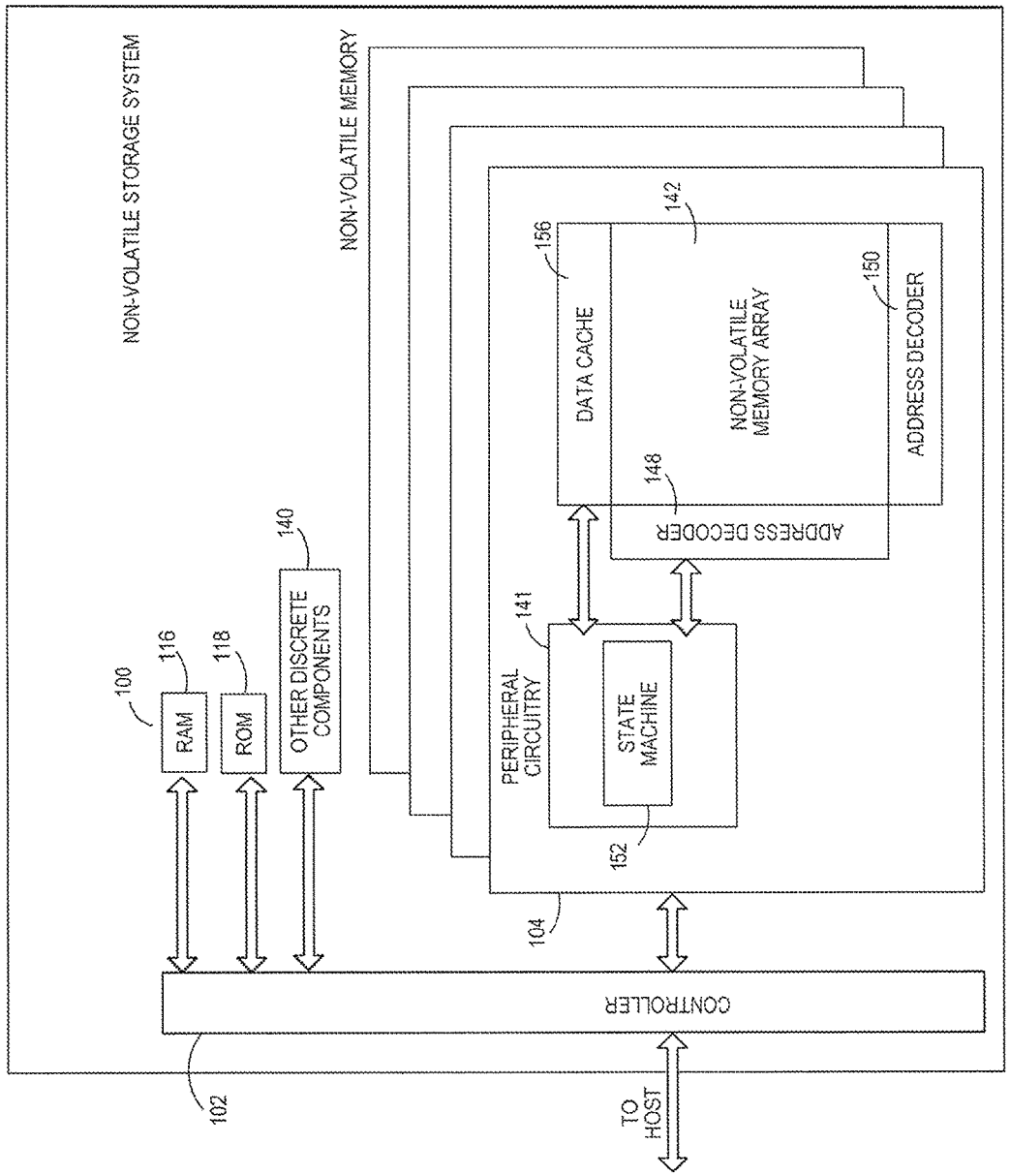
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
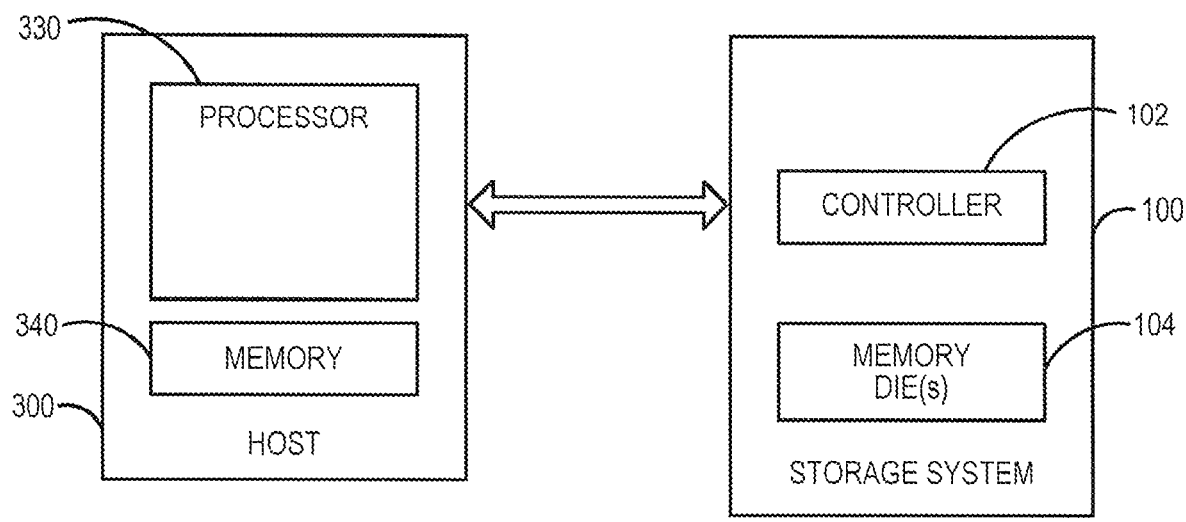
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to read data from and write data to the storage system 100, as well as perform error analysis on crash logs from the storage system 100.

As enormous amounts of data can be stored and processed in the storage system 100, automation can be a key aspect of data management. When the data is stored, the host 300 can maintain a file system with logical data. For retrieval purposes, this logical data corresponds to a file/database. In applications such as automotive internet of things (IoT), autonomous vehicles, connected cars, and surveillance, the data storage is usually continuous. In such situations, the application or the host 300 needs to maintain logic/software to map different files to different dates or time at a "file level" granularity. If the database is large, the retrieval is time consuming. For example, if an incident needs evaluation (automated or manual), the entire database/file related to the time of the incident needs access. This is not optimum and can create hurdles in automation of incidence evaluation. This is complicated by the fact that, with connected devices, any system can write and retrieve data from the storage system 100.

The following embodiments can be used to avoid the dependency of a file system or a file on a logical range. In general, in one embodiment, the storage system 100 receives time information and a write command with a logical address from the host 300, and the controller 102 in the storage system 100 creates a time-to-logical-block-address map. In this way, when the host 300 later wants to retrieve data that occurred at a particular time, the host 300 can send a read request to the storage system 100 specifying the time, and the controller 102 can use the time-to-logical-block-address map to determine the logical block address associated with that time. Then, the controller 102 can use a standard logical-to-physical address table to determine the physical address in the memory 104 from which to read the data. With these embodiments, the data retrieval mechanism is made more optimal and can be better automated as compared to the approaches described above.

The time information from the host 300 can take any suitable form. For example, the time information can be absolute host time (e.g., time from the host's clock or a clock from a time source in communication with the host 300 via a network). As another example, the time information can be part of the data to be written in the memory 104 by the write command (e.g., relative time through a program clock reference embedded in the transport data). The following paragraphs will describe an example implementation in which the write data is video data. It should be noted that this is merely an example, and other implementations can be used.

In one example, the video data is in the Moving Picture Experts Group Transport Stream (MPEG-TS) format, although other formats can be used. In general, with video compression, different video frames are compressed using different compression algorithms. Different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (PEG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression.

Further, an Instantaneous Decoder Refresh (IDR) frame is a group of I-frame slices. With an IDR frame, all pictures in a reference buffer are marked as use for reference, and all subsequently-transmitted slices are decoded without reference to any frame decoded prior to the IDR frame. No frame after the IDR frame can reference any frame before it. IDR frames are used to avoid any distortions in the video when fast-forwarding. IDR frames are particularly useful for comparison to the reference image from the host because IDR frames are independently-decodable frames on par with an image.

In one embodiment, the time information is obtained from time stamps of the I-frames. The time stamps can comprise a Program Clock Reference (PCR) of a Moving Picture Experts Group (MPEG) transport stream. Only the MPEG header needs parsing from the stack to determine the PCR, and the video program header can be parsed to locate the IDR. In this embodiment, instead of synchronizing the storage system's clock to host-provided absolute time, the storage system 100 can parse and lock to the program clock reference (PCR) of the input data. As will be described below, this allows the host 300 to make a retrieval request in the PCR time domain.

The storage system 100 can synchronize to the host-provided time and create and maintain a time-to-logical (T2L) map with the entries in the map managed in time order. The significance of the storage system 100 locking to an I-frame is that it is independently decodable without any dependency on previous data and is also the first frame of a group of pictures (GOP), thereby enabling the host 300 to quickly receive the exact frame(s) of importance. Locking to the exact frame of importance keeps the data set simple, thereby easing the automation process and allowing access by multiple parties. The retrieving party need not cache the entire file to perform evaluation.

FIG. 4 illustrates how the time-to-logical table can be created. As shown in FIG. 4, the host 300 sends a plurality of write commands to the storage system 100 with logical block addresses (LBAs) A, B, and N. The controller 102 of the storage system 100 locks onto the I-frames in these write commands to determine their logical counterparts and locking times. Assuming one I-frame per group of pictures (GOP) and one GOP per second, the controller 102 can create one entry per second in the time-to-logical table (in this example, at times a, b, and n). That is, in this example, the controller 102 evaluates the running time and the time distance between the I-frames from the program clock reference (PCR) available in the stream to create logical-to-time entries.at an IDR or I-frame granularity of the video data. It should be noted that while the time-to-logical-block-address map entries are at a one-second granularity in this example, different storage systems can maintain the time-to-logical-block-address map entries at different granularities (e.g., based on the resolution of data retrieval).

Figure 7:
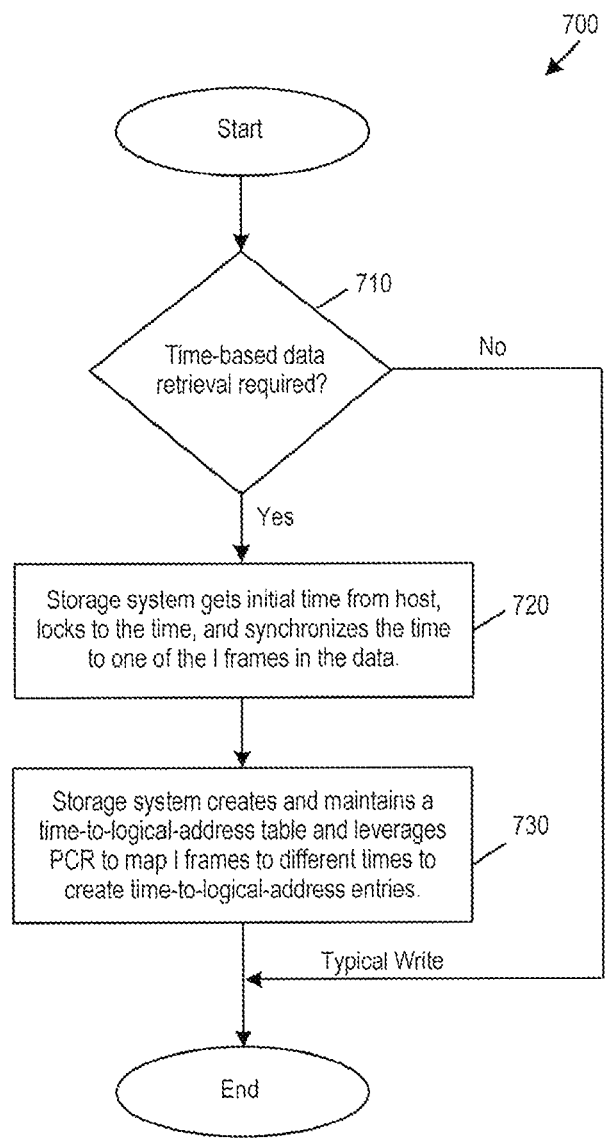
FIG. 7 is a flow chart of a method of an embodiment for creating a logical-address-to-time table.

This method is illustrated in the flow chart 700 of FIG. 7. As shown in FIG. 7, the controller 102 of the storage system 100 first determines if time-based data retrieval is required (act 710). If it is, the storage system 100 gets the initial time from the host 300, locks to the time, and synchronizes the time to one of the I-frames in the data (act 720). The storage system 100 then creates and maintains a time-to-logical address table and leverages the PCR to map the I-frames to different times to create the time-to-logical address table entries (act 730).

Unlike a logical address, time is not constant. So, the time-to-logical-block-address mapping can result in a running table where new time entries would replace older time entries. At any point in time, there can be start and end times mapped to the logical capacity of the memory 104, and the start and end times can change during host writes/overwrites.

On determining that the input is no longer video, the controller 102 can populate the time-to-logical-block-address map with invalid entries. Similarly, on determining that the logical data is broken for a time entry, the controller 102 can populate invalid entries in the time-to-logical-block-address map. The invalid entries will enable the storage system 100 to report a mapping problem to the host 300 on a time-based data retrieval request rather than sending wrong data/frame. This ensures backward compatibility, so the host 300 can issue typical commands.

Figure 8:
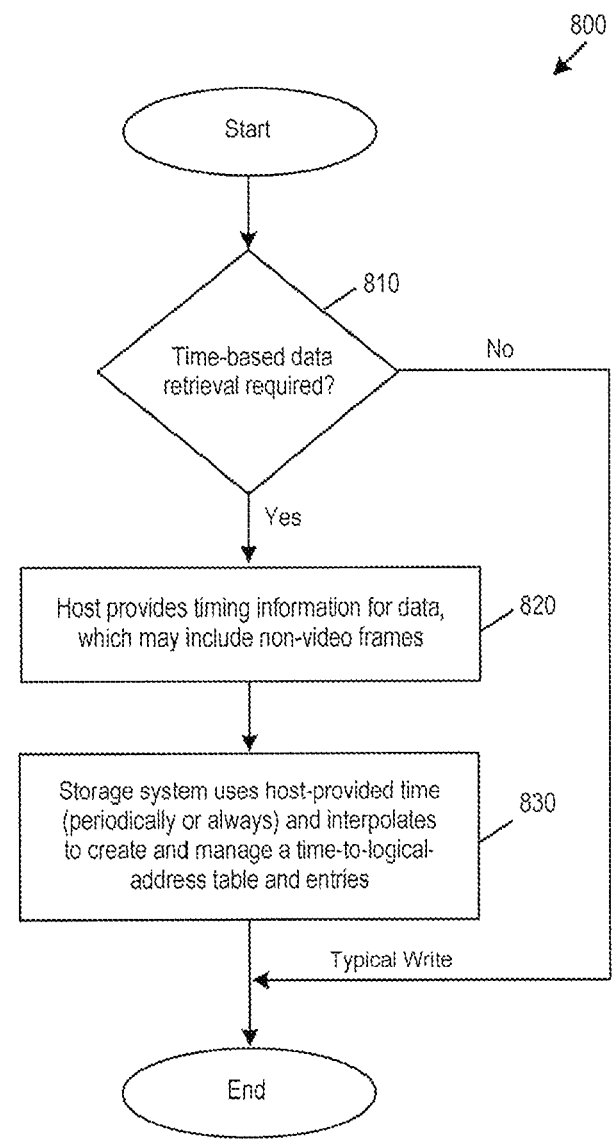
FIG. 8 is a flow chart of a method of an embodiment for creating a logical-address-to-time table when there is both video and non-video data in a stream.

It is also possible that the data contains both video and non-video data. In this situation, the method shown in the flow chart 800 of FIG. 8 can be used. As shown in FIG. 8, the controller 102 of the storage system 100 first determines if time-based data retrieval is required (act 810). If it is, the storage system 100 gets host-provided timing information for the data, which may include non-video frames (act 820). The storage system 100 then uses the host-provided time (periodically or always) and interpolates it to create and maintain a time-to-logical address table (act 830).

Figure 5:
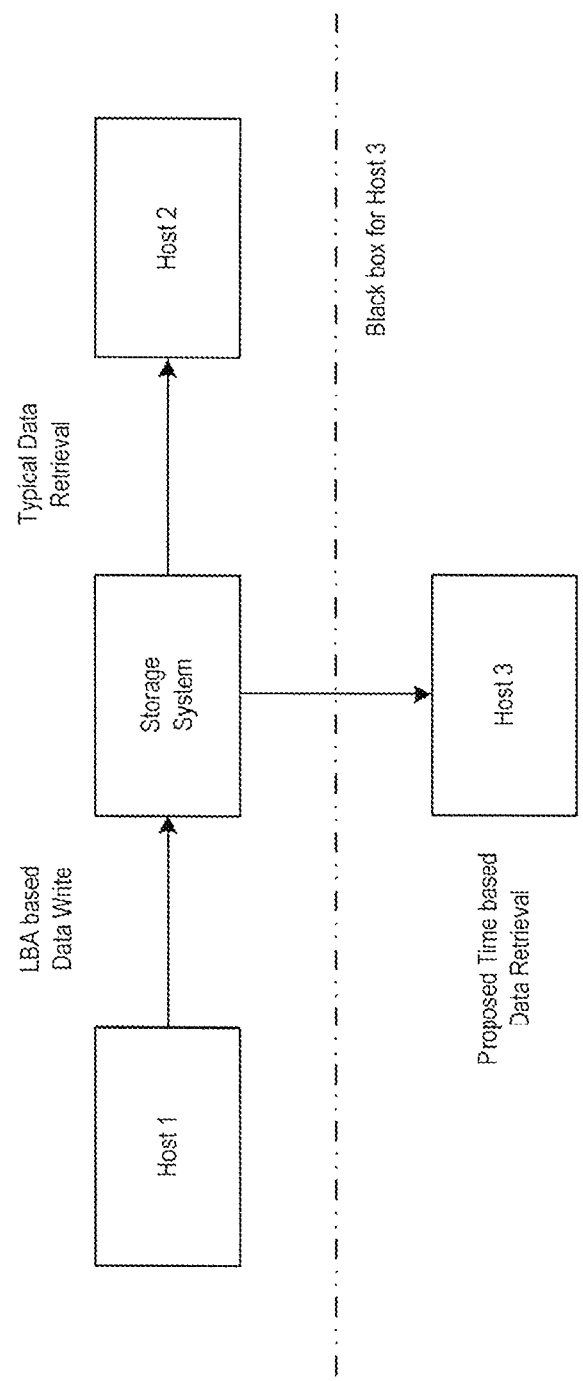
FIG. 5 is an illustration of a storage system of an embodiment in communication with a plurality of hosts.
Figure 6:
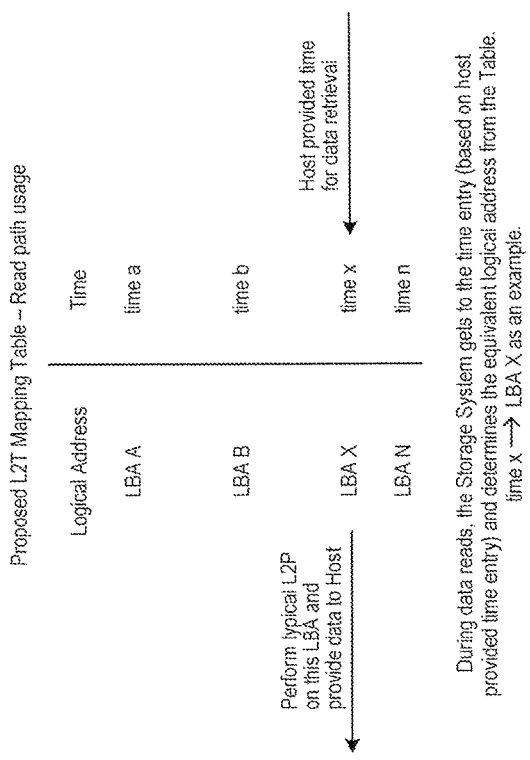
FIG. 6 is an illustration of a logical-address-to-time table of an embodiment.

As shown in FIG. 5, using a time-to-logical-block-address map, the storage system 100 can act as a "black box" for certain hosts that may wish to access the data purely on a time basis without any dependency on the way it was stored, its file system, or its logical mapping. As shown in FIG. 6, during data retrieval, the storage system 100 receives the retrieval time (rather than LBA) from the host 300 and uses the time-to-logical-block-address map (in reverse) to determine the corresponding time-mapped logical address of the I-frame. Further retrieval of the data from a physical location in the memory 104 would be through typical logical-to-physical (L2P) address mapping. With this embodiment, data transfers can be vastly reduced, as the frame relating to the retrieval time is directly available, which avoids the host 300 reading the entire file or database.

Figure 9:
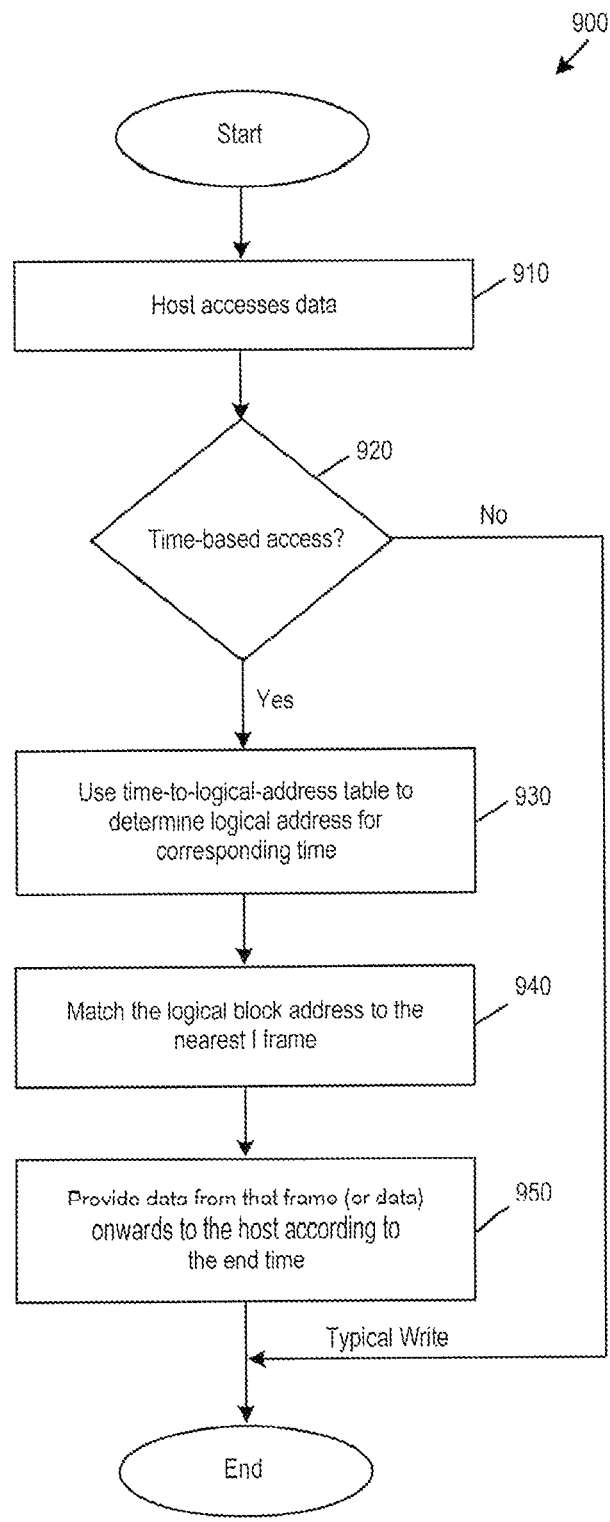
FIG. 9 is a flow chart of a method of an embodiment for time-based data retrieval.

During data retrieval, the device 100 receives the time (rather than LBA) from the host 300, uses the time-to-logical-block-address map to determine the logical address of the I-frame, and further retrieves the data from physical location as a typical device would do through its logical-to-physical address mapping. This is illustrated in the flow chart 900 in FIG. 9. As shown in FIG. 9, the host 300 requests access to the data (act 910), and the controller 102 of the storage system 100 determines if the access is a time-based access (act 920). If it is, the controller 102 uses the time-to-logical address table to determine a logical address for a corresponding time (act 930). The controller 102 then matches the logical block address to the nearest I-frame (act 940) and provides the data from that frame (or data) onwards to the host 300 according to the end time (act 950).

There are several alternatives that can be used with these embodiments. In one alternative, relating time to logical data allows a time slot to be marked as an endurance slot. For example, a specific time during different days (e.g., 8 am-9 am) can be set as a priority time. The storage system 100 can treat such time slots as a high endurance or a high protection slot on par with handling a specific logical region in typical Non-Volatile Memory Express (NVMe) devices. Such a use case can assist surveillance systems, internet of things (IoT) sensors, and automotive systems where different cameras/sensors are recording in different places at different time slots, some of which are important. The logical address of data in such time slots would be different.

It should be noted that while the above examples were described in terms of video data, non-video data (e.g., audio data) can also be used. So, the term "media data" is used herein to refer to video data and/or non-video data. Also, PCR timestamps can be used with non-video data, and any other type of timestamp can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller configured to:
   receive time information from a host;
   receive a write command from the host, wherein the write command comprises a plurality of logical block addresses and video data comprising a plurality of video frames, each video frame being associated with a respective logical block address; and
   create a time-to-logical-block-address map for logical block addresses of a subset of the plurality of video frames from the time information, wherein a granularity between entries in the time-to-logical-block-address map is determined by a time distance between selected frames of the plurality of video frames.

2. The storage system of claim 1, wherein the time information is part of the video data.

3. The storage system of claim 1, wherein the video data comprises intra-coded picture frames (I-frames).

4. The storage system of claim 3, wherein the time information is obtained from time stamps of the I-frames.

5. The storage system of claim 4, wherein the time stamps comprise a Program Clock Reference (PCR) of a Moving Picture Experts Group (MPEG) transport stream.

6. The storage system of claim 1, wherein the controller is further configured to:
   receive a command to read a video frame associated with a certain time;
   determine a logical address of the video frame associated with the certain time using the time-to-logical-block-address map;
   determine a physical address in the memory from the logical address using a logical-to-physical address map; and
   read the video frame stored at the physical address in the memory.

7. The storage system of claim 1, wherein start times and end times of the time-to-logical-block-address map change during host writes.

8. The storage system of claim 1, wherein the time information from the host comprises absolute host time.

9. The storage system of claim 1, wherein the controller is further configured to populate the time-to-logical-block-address map with an invalid entry for a subsequent write command.

10. The storage system of claim 1, wherein the controller is further configured to mark an entry in the time-to-logical-block-address map as high endurance.

11. The storage system of claim 1, wherein the memory comprises a three-dimensional memory.

12. The storage system of claim 1, wherein start times and end times of the time-to-logical-block-address map change during host overwrites.

13. A method for enabling time-based data retrieval, the method comprising:
   performing the following in a storage system comprising a memory:
   receiving time information from a host;
   receiving a write command from the host, wherein the write command comprises a plurality of logical block addresses and video data comprising a plurality of video frames, each video frame being associated with a respective logical block address; and
   creating a time-to-logical-block-address map for logical block addresses of a subset of the plurality of video frames from the time information, wherein a granularity between entries in the time-to-logical-block-address map is determined by a time distance between selected frames of the plurality of video frames.

14. The method of claim 13, wherein the video data comprises intra-coded picture frames (I-frames).

15. The method of claim 14, wherein the time information is obtained from time stamps of the I-frames.

16. The method of claim 13, wherein the time information comprises Program Clock Reference (PCR) time stamps.

17. The method of claim 13, further comprising:
receiving a command to read a video frame associated with a certain time;
determining a logical address of the video frame associated with the certain time using the time-to-logical-block-address map;
determining a physical address in the memory from the logical address using a logical-to-physical address map; and
reading the video frame stored at the physical address in the memory.

18. The method of claim 13, further comprising marking an entry in the time-to-logical-block-address map as high endurance.

19. The method of claim 13, wherein start times and end times of the time-to-logical-block-address map change during host overwrites.

20. A storage system comprising:
a memory;
means for receiving time information from a host;
means for receiving a write command from the host, wherein the write command comprises a plurality of logical block addresses and video data comprising a plurality of video frames, each video frame being associated with a respective logical block address; and
means for creating a time-to-logical-block-address table for logical block addresses of a subset of the plurality of video frames from the time information, wherein a granularity between entries in the time-to-logical-block-address table is determined by a time distance between selected frames of the plurality of video frames.

* * * * *